United States Patent
Rössinger

(10) Patent No.: US 7,744,514 B2
(45) Date of Patent: Jun. 29, 2010

(54) MACHINING STATION AND METHOD FOR PRODUCING VEHICLE BODIES

(75) Inventor: Markus Rössinger, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 778 days.

(21) Appl. No.: 11/604,629

(22) Filed: Nov. 27, 2006

(65) Prior Publication Data

US 2007/0125832 A1  Jun. 7, 2007

(30) Foreign Application Priority Data

Dec. 2, 2005  (DE) ....................... 10 2005 057 602

(51) Int. Cl.
  *B23Q 3/155*  (2006.01)
  *B23P 19/00*  (2006.01)
  *B23K 37/04*  (2006.01)

(52) U.S. Cl. .............................. 483/1; 483/15; 483/16; 483/901; 228/212; 228/4.1; 228/6.1; 228/49.1; 29/897.2; 29/559; 29/281.1; 29/281.5

(58) Field of Classification Search .................. 228/212, 228/4.1, 5.1, 6.1, 49.1; 483/1, 14–15, 901, 483/16; 29/281.1, 281.5, 281.4, 783, 791, 29/795, 559, 897.2, 824
See application file for complete search history.

(56) References Cited

U.S. PATENT DOCUMENTS

| 4,162,387 A | | 7/1979 | De Candia |
|---|---|---|---|
| 4,256,947 A | | 3/1981 | De Candia |
| 4,636,135 A | * | 1/1987 | Bancon ....................... 483/901 |
| 6,438,842 B1 | | 8/2002 | Raami |

FOREIGN PATENT DOCUMENTS

| AT | 411033 B | 2/2003 |
|---|---|---|
| DE | 28 10 822 C2 | 9/1978 |
| DE | 19828235 A1 | 1/2000 |
| DE | 199 14 125 A1 | 9/2000 |
| EP | 1277540 A2 | 1/2003 |
| EP | 1352816 A2 | 10/2003 |
| EP | 1413385 A2 | 4/2004 |
| WO | WO 95/19868 | 7/1995 |
| WO | 9845161 A1 | 10/1998 |

OTHER PUBLICATIONS

Machine translation of EP-1277540 (which '540 was published on Jan. 22, 2003), three pages.*
European Search Report dated Apr. 1, 2008.

* cited by examiner

*Primary Examiner*—Erica E Cadugan

(57) ABSTRACT

A machining station and a method produce vehicle bodies of different types. A clamping station has interchangeable clamping frames, at least one clamping frame magazine, into which the interchangeable clamping frames are deposited when not in use and from which the interchangeable clamping frames are removed when in use, and at least one robot for transporting the interchangeable clamping frames. The interchangeable clamping frames, in particular the clamping frames for the vehicle body side parts, are divided into a plurality of separable segmental clamping frames, with, to convert to a different type of vehicle body, one segmental clamping frame in each case being transported by a robot from the clamping station to the clamping frame magazine, being deposited there, a segmental clamping frame of a different type being removed from the clamping frame magazine and this segmental clamping frame being transported to the clamping station.

9 Claims, 4 Drawing Sheets

MACHINING STATION AND METHOD FOR PRODUCING VEHICLE BODIES

CROSS-REFERENCE TO RELATED APPLICATION

This application claims the priority, under 35 U.S.C. §119, of German application DE 10 2005 057 602.8, filed Dec. 2, 2005; the prior application is herewith incorporated by reference in its entirety.

BACKGROUND OF THE INVENTION

Field of the Invention

The invention relates to a machining station for vehicle bodies of different types on a production line. The station includes a clamping station with interchangeable clamping frames which have positioning, holding and clamping devices for a vehicle body part of a certain type, at least one clamping frame magazine, into which the interchangeable clamping frames are deposited when not in use and from which the interchangeable clamping frames are removed when in use, and transporting means for the interchangeable clamping frames, with which the interchangeable clamping frames can be moved from the clamping frame magazine to the clamping station and back. The invention further pertains to a method for producing vehicle bodies of different types on a production line, wherein clamping frames which have positioning, holding and clamping devices for a vehicle body of a certain type are interchanged in a clamping station to convert production to a vehicle body of a different type, the clamping frames being deposited in at least one clamping frame magazine when not in use and being removed from the at least one clamping frame magazine when in use.

In production lines of this type for the assembly of vehicle bodies, the geometrical orientation of the individual vehicle body parts with respect to one another and with respect to the machining and welding robots is realized by means of rigid and heavy clamping frames which at the same time form a stable means of securing the easily deformable vehicle body parts.

If the vehicle body is moved into the joining station or geometrical welding installation of the production line in a pre-fixed manner, the clamping frames are moved up to the vehicle body and serve to precisely fix and secure the individual vehicle body part.

U.S. Pat. Nos. 4,256,947 and 4,162,387, and their counterpart German patent DE 28 10 822 C2 disclose a device for welding together vehicle body components for motor vehicles, wherein the loose joining together of the individual vehicle body parts and the subsequent precise positioning and geometrical welding take place in respectively dedicated stations. The transport from one station to the next takes place via a transporting track. The vehicle body side parts which are loosely joined together to other vehicle body parts are brought into position and clamped by clamping frames which are movable from a standby position into a working position and back, perpendicularly to the transporting track, and on which positioning devices are fitted. The positioning devices are adapted to the geometrical shape of the vehicle body part. The clamping frames are suspended pivotably on rails running in the transporting direction. For conversion to another type of vehicle body, the clamping frames have to be interchanged or the positioning devices adapted. To interchange the clamping frames for another set of clamping frames, the positioning devices of which are matched to the geometrical shape of another type of vehicle body, the clamping frames are moved on the rails, brought into the standby position and exchanged. The changing from one type of vehicle body to the next is highly complicated and inflexible and is associated with a need for a large amount of space.

German published patent application DE 199 14 125 A1, which is commonly assigned, discloses a method for producing vehicles of different models of vehicle on a production line, and a joining station, wherein, when changing the model of vehicle within a production line, the outlay on time is minimized and at the same time the space required by the production line is reduced. In this case, different models of vehicle pass in each case through the same machining stations of the production line. In the joining station, the vehicle body parts, which are pre-fixed on a vehicle frame, are secured by clamping elements arranged on clamping frames. These clamping frames are fitted in a manner specific to the type of vehicle with clamping frames for the exact orientation and securing of the vehicle body parts. The clamping frames are arranged on guides on which they can be brought from a working position into a rest position and vice-versa. When changing the model of vehicle, the joining station has to be adapted to the new model of vehicle. For this purpose, the clamping frames are interchanged during one working cycle. The clamping frame is brought into the rest position, is decoupled from the guide and is brought by an elevator into a magazine wherein different clamping frames are deposited. At the same time, a new clamping frame is retrieved from the magazine via a further elevator and is coupled into the guide. However, because of the heavy weight of and large amount of space required by the clamping frames, the changing thereof still remains highly complicated and inflexible and is associated with cycle time losses.

In other production lines, the individual vehicle body parts are supplied to the joining station with the clamping frames, as described, for example, in published international PCT application WO 95/19868. The heavy weight of and the large amount of space required by the clamping frames, which require robust handling, is likewise disadvantageous there.

In modern installations, conveying systems bring the floor assembly and the side parts to a vehicle body carcass installation. Handling robots grip the side parts of the vehicle body there by their clamping frames, which are designed as side part grippers, and position them directly in the geometrical station. The clamping frames are then locked to one another and the vehicle body parts are welded together. Although these installations are highly flexible, forces for joining the vehicle body parts can only be applied to a limited extent by the clamping frames held by the robots.

SUMMARY OF INVENTION

It is accordingly an object of the invention to provide a machining station and a method of producing vehicle bodies which overcome the above-mentioned disadvantages of the heretofore-known devices and methods of this general type and which provide for a most flexible joining station that permits a simple, space-saving and time-saving conversion of the type of vehicle body and a joining together of vehicle body components with low constructional tolerances.

With the foregoing and other objects in view there is provided, in accordance with the invention, a machining station for producing vehicle bodies of different types on a production line, the machining station comprising:

a clamping station with interchangeable clamping frames having positioning, holding and clamping devices for a vehicle body part of a certain type;

at least one clamping frame magazine configured to have the interchangeable clamping frames deposited therein when not in use and to have the interchangeable clamping frames removed therefrom for use in the clamping station;

at least one transport robot configured for moving the interchangeable clamping frames between the at least one clamping frame magazine and the clamping station;

wherein at least one of the interchangeable clamping frames is formed of a plurality of separable segmental clamping frames and the at least one robot is configured for transporting the separated segmental clamping frames.

The machining station according to the invention for producing vehicle bodies of different types on a production line comprises at least one clamping station with interchangeable clamping frames, at least one clamping frame magazine, into which the interchangeable clamping frames are deposited when not in use and from which the interchangeable clamping frames are removed when in use, and at least one robot as transporting means, with which the interchangeable clamping frames can be moved from the clamping frame magazine to the clamping station and back. Positioning, holding and clamping devices for a vehicle body part of a certain type are fastened to the clamping frames. The interchangeable clamping frames, in particular the clamping frames for the vehicle body side parts, are divided into a plurality of separable segmental clamping frames, so that the segmental clamping frames can be interchanged individually and flexibly by means of at least one robot.

With the above and other objects in view there is also provided in accordance with the invention, an improved method of producing vehicle bodies of different types on a production line wherein clamping frames with positioning, holding and clamping devices for a vehicle body of a certain type are interchanged in a clamping station to convert production to a vehicle body of a different type; and the clamping frames are deposited in at least one clamping frame magazine when not in use and removed from the at least one clamping frame magazine when in use;

the improvement which comprises:

providing at least one of the clamping frames as a separable clamping frame that is separable into individual segmental clamping frames;

interchanging a clamping frame in the clamping station in each case by transporting one segmental clamping frame with a robot from the clamping station to the clamping frame magazine, depositing the segmental clamping from in the clamping frame magazine, removing a segmental clamping frame of a different type from the clamping frame magazine, and transporting the segmental clamping frame of the different type to the clamping station.

In the method according to the invention for producing vehicle bodies of different types on a production line, to interchange the clamping frames at least one clamping frame, which can be separated into individual segmental clamping frames, is interchanged in the clamping station, one segmental clamping frame in each case being transported by a robot from the clamping station to the clamping frame magazine, being deposited there, a segmental clamping frame of a different type being removed from the clamping frame magazine and said segmental clamping frame being transported to the clamping station.

In this case, firstly, the division of the clamping frames into segmental clamping frames enables the weight to be reduced in terms of orders of magnitude of loads carried by robots, so that complicated, rigid transporting units can be dispensed with, and, secondly, at the same time enables the closing of the clamping frames to take place by means of drive units of the clamping station, so that the required clamping forces can be applied to the vehicle body.

The machining station according to the invention and the method according to the invention are suitable for producing vehicle bodies of different types on a production line, in particular for producing vehicles of different types, the different types passing in each case through the same processing station and a conversion of production to a different type taking place by means of at least the interchanging of the clamping frames by means of robots. In particular, in the clamping station of the machining station, individual, previously loosely joined-together vehicle body parts are secured, centered and clamped by the segmental clamping frames and are subsequently welded together.

In a preferred embodiment of the invention, each segmental clamping frame for a certain type of vehicle body is assigned a clamping frame magazine wherein a plurality of interchangeable segmental clamping frames for vehicle body parts of different types are arranged or can be arranged. In this way, the segmental clamping frames can be interchanged at the same time and quickly with a number of robots corresponding to the number of segmental clamping frames to be interchanged, so that, during conversion of the production line to a different type, the cycle time losses due to the conversion are minimized.

Each segmental clamping frame for a certain type of vehicle body is preferably assigned a tool magazine wherein a plurality of interchangeable joining tools, in particular welding tools, for vehicle body parts of different types are arranged or can be arranged. The joining tools can then likewise be interchanged at the same time preferably by means of the respective robots assigned to the corresponding segmental clamping frames.

In a preferred embodiment of the invention, the clamping station has receiving means for one segmental clamping frame in each case, so that each segmental clamping frame can be arranged separately in the clamping station and, in this case, the segmental clamping frames are preferably likewise arranged by the robots in the clamping station and are removed from the latter. For each segmental clamping frame, corresponding coupling points, holding and clamping devices are preferably provided at the clamping station.

The receiving means of one segmental clamping frame in each case are preferably connected to drive units for the horizontal displacement of the receiving means of a segmental clamping frame, so that a respective segmental clamping frame arranged in the clamping station can be displaced in the clamping station by the drive units from an interchanging position into a locking position and vice-versa.

In a further preferred embodiment of the invention, the drive units of the segmental clamping frames are connected to a control unit which preferably realizes a synchronous control of the drive units of a segmental clamping frame and preferentially a synchronous control of the drive units of all the segmental clamping frames, so that the displacement of the segmental clamping frames from an interchanging position into a locking position and vice-versa can take place synchronously.

Other features which are considered as characteristic for the invention are set forth in the appended claims.

Although the invention is illustrated and described herein as embodied in a machining station and method for producing vehicle bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
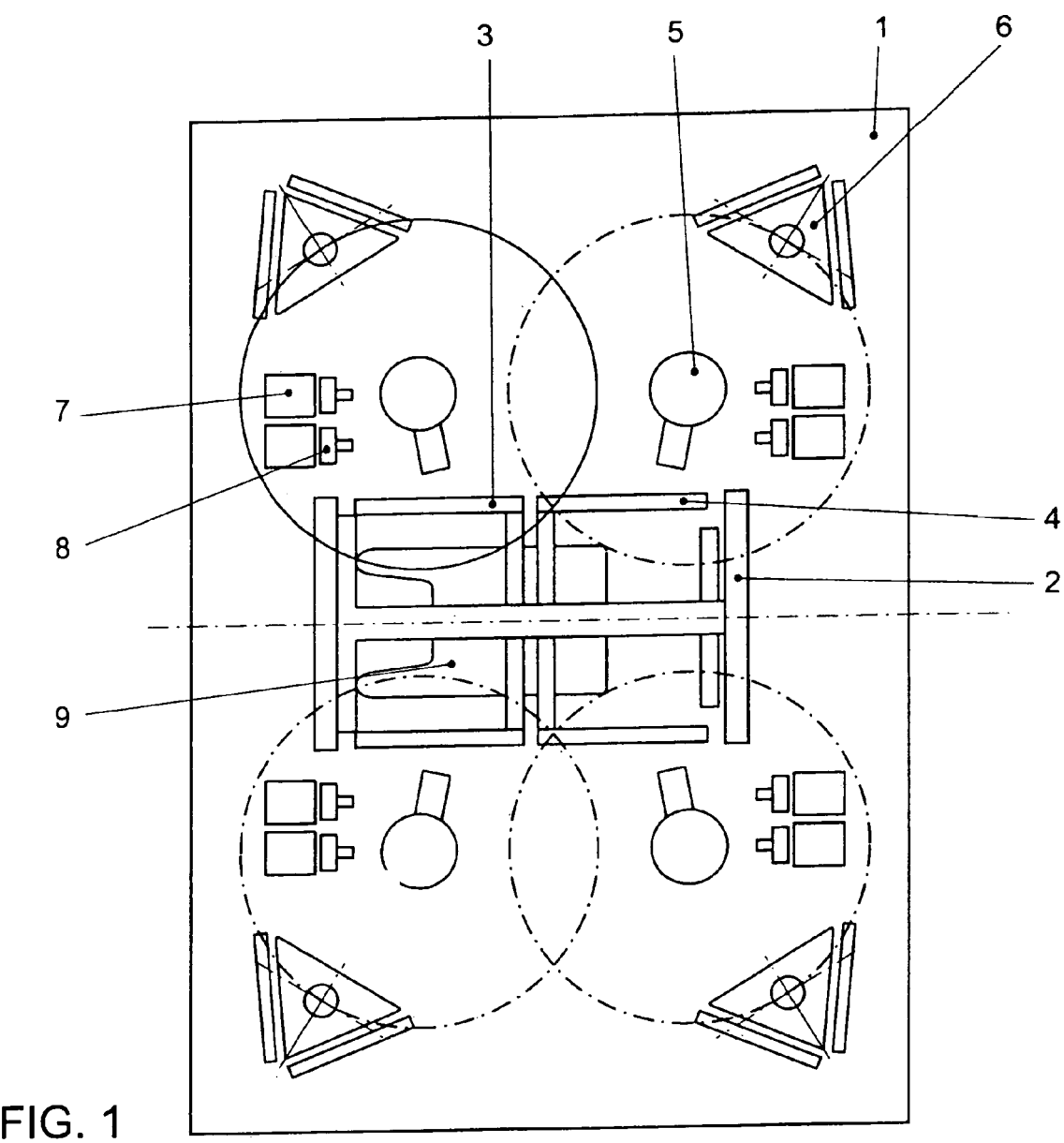
FIG. 1 is a diagrammatic overview of a machining station according to the invention.

Referring now to the figures of the drawing in detail and first, particularly, to FIG. 1 thereof, there is shown, in a diagrammatic overview, an exemplary embodiment of a machining station according to the invention, in the form of a geometrical welding station 1 of a production line for vehicle bodies of different types. The geometrical welding station 1 comprises the clamping station 2, which comprises a steel construction, two clamping frames which are divided in each case into a front segmental clamping frame 3 and a rear segmental clamping frame 4 and have corresponding clamping devices 26 for the side parts of the vehicle body 9, four robots 5 assigned to the segmental clamping frames 3, 4, in each case four rotatable clamping frame magazines 6 which are assigned to the segmental clamping frames 3, 4 and have segmental clamping frames for three different types of vehicle body, and tool magazines 7 with the respective joining tools 8.

Figure 2:
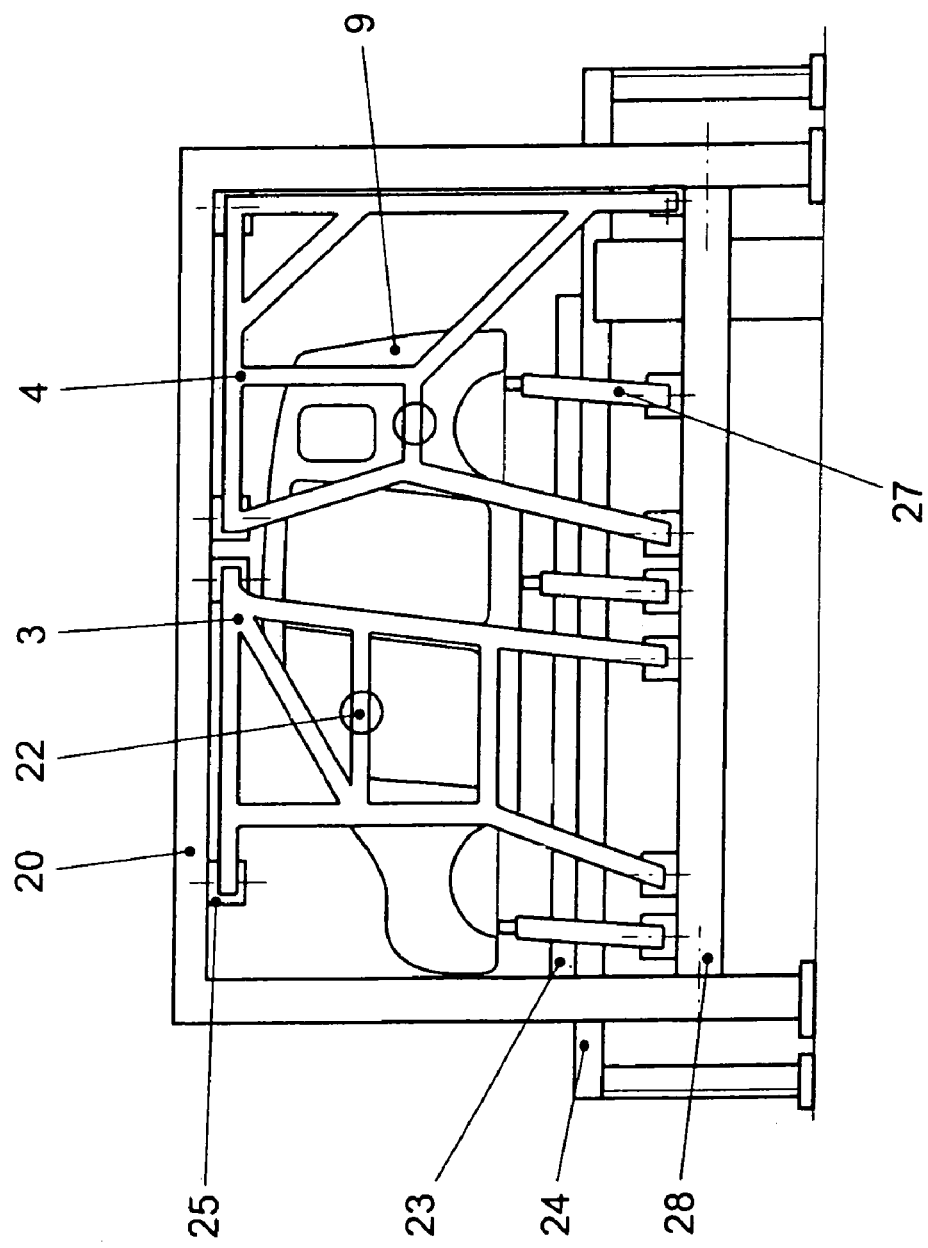
FIG. 2 shows a diagrammatic side view of a clamping station.

FIG. 2 diagrammatically illustrates a side view of the clamping station 20. The rolling track 24 for transporting the vehicle bodies 9 between the individual machining stations of the production line runs through the clamping station 20. When converting production from a type A vehicle body to a type B vehicle body, the clipped vehicle body 9 of type B is conveyed by a transporting skid 23 by means of the rolling track 24 into the clamping station 20 of the geometrical welding station 1. During the conveying operation, the four robots 5 reach into the respective automatic changing system 22 of the front segmental clamping frames 3 and rear segmental clamping frames 4 of the previously produced type A, lift the latter out of the clamping frame receptacles 25 of the clamping station 20 and deposit them into the respectively assigned clamping frame magazines 6, the clamping frame magazines 6 being in the receiving position for the segmental clamping frames of type A. The clamping frame magazines 6 now rotate the segmental clamping frames 3, 4 of type B to the robots 5. The robots 5 remove the segmental clamping frames 3, 4 of type B from the clamping frame magazine 6 with the aid of the automatic changing systems 22, which are fastened to the segmental clamping frames 3, 4 and with which the robots 5 can grip and hold the clamping frames 3, 4 and can transport them to the clamping station 20. The robots 5 position the segmental clamping frames 3, 4 in the clamping frame receptacles 25 of the clamping station 20 and subsequently release them.

Figure 3:
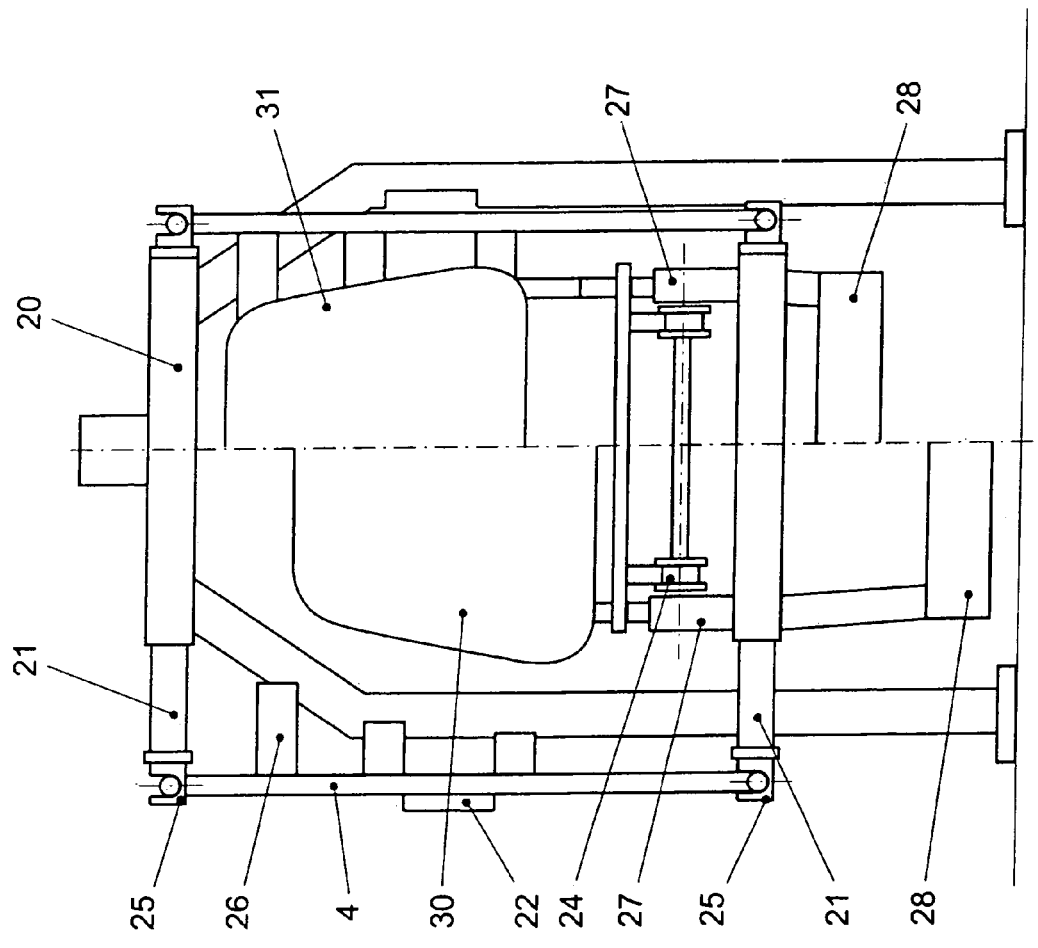
FIG. 3 shows a diagrammatic rear view of a clamping station.

During the interchanging of the segmental clamping frames 3, 4, the vehicle body 9 of type B is raised by the rolling track 24 from a conveying position 30 into a working position 31 by raising of the substructure clamping frame 28 by the substructure clamping devices 27. The conveying position 30 and the working position 31 are illustrated in FIG. 3. The vehicle body substructure is clamped geometrically by the substructure clamping devices 27.

Subsequently, the segmental clamping frames 3, 4 of type B are brought by synchronous moving of the drive unit 21 from an interchanging position, illustrated on the left in FIG. 3, into a locking position, illustrated on the right in FIG. 3.

Figure 4:
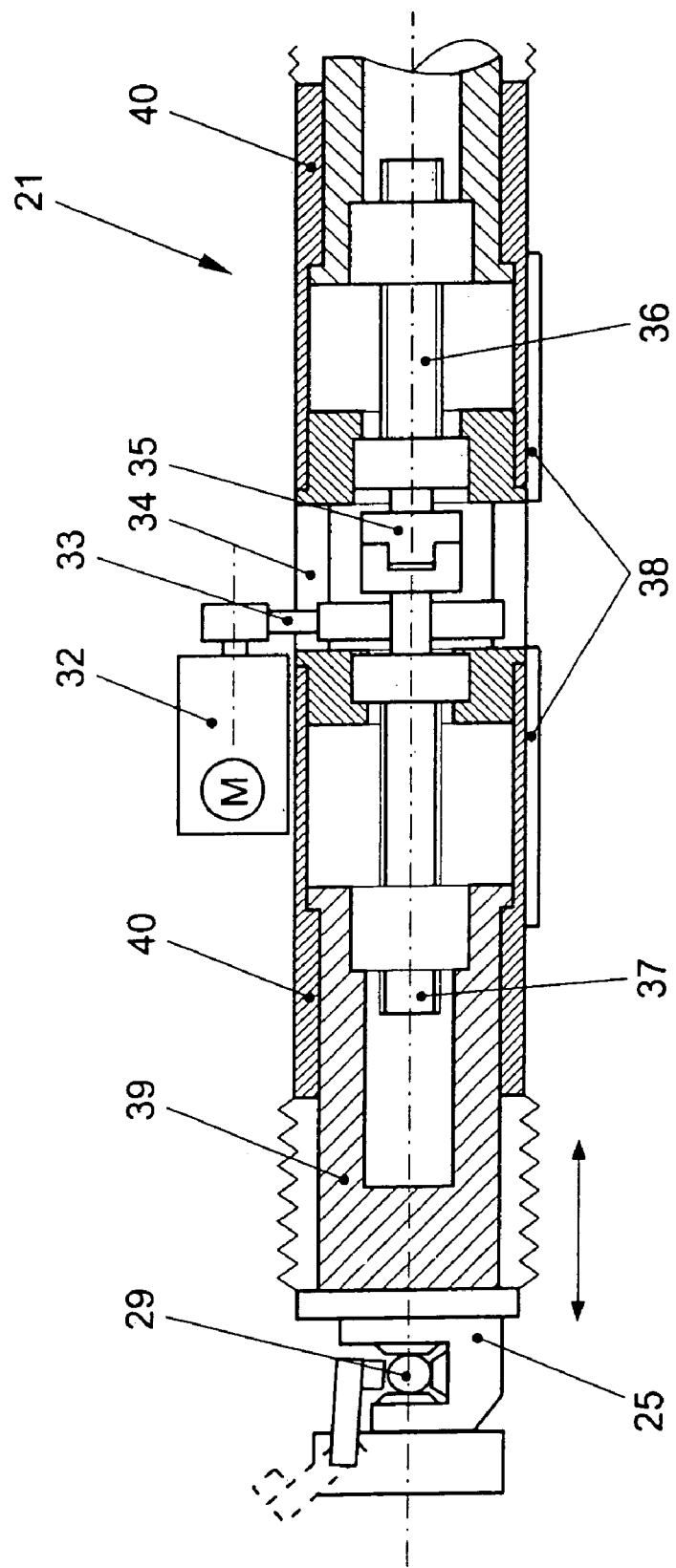
FIG. 4 shows a clamping frame drive.

In this case, the drive units 21 can preferably be designed, as illustrated in more detail in FIG. 4, as respectively coupled drives for two opposite front and rear segmental clamping frames 3 and 4, respectively. Each segmental clamping frame 3, 4 is moved by a plurality of drive units 21, with the motors 32 of the drive units 21 being controlled synchronously by means of control technology which is known per se. The drive units 21 comprise a ball screw with a left-handed thread 36 and a ball screw with a right-handed thread 37, which are connected to each other via a coupling 35. The coupled ball screws 36, 37 are connected via a toothed belt 33 to the motor 32 and in each case to a sleeve 39. The sleeves 39 are mounted displaceably in the housing parts 40, which are interconnected by a connecting part 34, and the housing parts 40 are fastened to the clamping station 20 by means of a screw-on flange 38. The clamping frame receptacles 25 are fastened to the ends of the sleeves 39 and, during operation of the motor 32, are simultaneously moved into the respective interchanging or locking position.

If the segmental clamping frames 3, 4 are brought into the locking position, the side parts of the vehicle body 9 are subsequently clamped geometrically by the centering pins and clamping devices 26.

While the segmental clamping frames 3, 4 move and the vehicle body is clamped geometrically, the robots 5 can remove the correspondingly required joining tools 8 from the tool magazines 7 and can transport them to the clamping station. If the entire vehicle body is clamped geometrically, the robots 5 execute the geometrical welding tasks on the vehicle body 9 by the joining tools 8.

After the welding tasks have been carried out, the clamping devices 26 open, the segmental clamping frames 3, 4 of type B are brought by synchronous movement of the drive units 21 from the locking position into the interchanging position and the vehicle body 9 is placed onto the transport skid 23 of the rolling track 24 by lowering of the lower clamping frame 28. The geometrically welded vehicle body 9 can subsequently be conveyed out of the clamping station 20 of the geometrical welding station 1 and a newly clipped in vehicle body 9 of the same or of a different type can be conveyed in.

I claim:

1. In a method of producing vehicle bodies of different types on a production line wherein:

clamping frames with positioning, holding and clamping devices for a vehicle body of a certain type are interchanged in a clamping station to convert production to a vehicle body of a different type;

the clamping frames are deposited in at least one clamping frame magazine when not in use and removed from the at least one clamping frame magazine when in use;

the improvement which comprises:

providing at least one of the clamping frames as a separable clamping frame that is separable into individual segmental clamping frames;

interchanging a clamping frame in the clamping station in each case by transporting one segmental clamping frame with a robot from the clamping station to the clamping frame magazine, depositing the one segmental clamping from in the clamping frame magazine, removing a segmental clamping frame of a different type from the clamping frame magazine, and transporting the segmental clamping frame of the different type to the clamping station;

providing a plurality of receiving means for accommodating a respective one of the segmental clamping frames and each said receiving means having a respective drive unit connected thereto for horizontal displacement of the respective receiving means;

displacing the respective one of the segmental clamping frames that is accommodated in the plurality of receiving means from an interchanging position to a locking position and vice versa with the respective drive unit for horizontally displacing the receiving means.

2. The method according to claim 1, which comprises exchanging clamping frames that are divided into two segmental clamping frames, for side parts of the vehicle body.

3. The method according to claim 1, which comprises exchanging one of the segmental clamping frames by one robot assigned to the segmental clamping frame being exchanged.

4. The method according to claim 3, which comprises simultaneously exchanging the segmental clamping frames with further segmental clamping frames.

5. The method according to claim 1, which comprises depositing joining tools for a certain type of vehicle body into at least one tool magazine and interchanging the joining tools for joining tools for a vehicle body part of a different type by way of the robot.

6. The method according to claim 1, wherein the robot is assigned to the one segmental clamping frame, and the method further comprises exchanging joining tools that are assigned to the one segmental clamping frame with the assigned robot.

7. The method according to claim 1, wherein the robot positions the one segmental clamping frames in the plurality of receiving means in the clamping station and remove the one segmental clamping frames from there.

8. The method according to claim 1, which comprises controlling the drive units of the respective one of the segmental clamping frames in synchronicity.

9. The method according to claim 1, which comprises, in the clamping station, holding, centering, and clamping individual, previously loosely joined-together vehicle body parts with the segmental clamping frames, and subsequently welding the vehicle body parts together.

* * * * *